US009821887B1

(12) United States Patent
Wilson et al.

(10) Patent No.: US 9,821,887 B1
(45) Date of Patent: Nov. 21, 2017

(54) CONVERTIBLE LEANING POST SEATING SYSTEM FOR MARINE VESSELS

(71) Applicant: Brunswick Corporation, Lake Forest, IL (US)

(72) Inventors: Jacob W. Wilson, Edgewater, FL (US); Paul Sherwood-Berndt, Titusville, FL (US)

(73) Assignee: Brunswick Corporation, Lake Forest, IL (US)

( * ) Notice: Subject to any disclaimer, the term of this patent is extended or adjusted under 35 U.S.C. 154(b) by 132 days.

(21) Appl. No.: 15/086,677

(22) Filed: Mar. 31, 2016

(51) Int. Cl.
*B63B 29/04* (2006.01)
*B60N 2/20* (2006.01)

(52) U.S. Cl.
CPC ............. *B63B 29/04* (2013.01); *B60N 2/20* (2013.01); *B63B 2029/043* (2013.01)

(58) Field of Classification Search
None
See application file for complete search history.

(56) References Cited

U.S. PATENT DOCUMENTS

| | | | | |
|---|---|---|---|---|
| 250,597 | A * | 12/1881 | St. John | B60N 2/203 297/100 |
| 831,877 | A | 9/1906 | Kling | |
| 4,736,982 | A * | 4/1988 | Hwang | A47C 9/005 297/118 |
| 5,054,857 | A * | 10/1991 | Kvalheim | A47C 1/027 297/118 |
| 5,261,727 | A * | 11/1993 | Klaebel | A47C 9/005 297/316 |
| 5,762,402 | A * | 6/1998 | Gillotti | A47C 9/005 297/338 |
| 5,782,534 | A * | 7/1998 | Desanta | A47C 7/024 297/300.2 |
| 5,904,401 | A * | 5/1999 | Alberda | A47C 17/2076 297/354.13 |
| 6,196,629 | B1 * | 3/2001 | Onishi | B60N 2/2806 297/256.12 |
| 7,172,252 | B2 | 2/2007 | Henning | |
| 7,647,880 | B2 | 1/2010 | Devine | |
| 7,661,382 | B2 | 2/2010 | Wood et al. | |
| 8,720,990 | B2 * | 5/2014 | Boydston | A47B 85/04 297/124 |
| 8,740,297 | B1 | 6/2014 | Foss et al. | |
| 9,021,975 | B1 | 5/2015 | Fodor et al. | |
| 9,073,608 | B1 | 7/2015 | Foss et al. | |
| D743,318 | S | 11/2015 | Curts | |
| 9,650,117 | B2 * | 5/2017 | Curts | B63B 35/85 |
| 2003/0197402 | A1 * | 10/2003 | McCutcheon | A47B 85/04 297/125 |
| 2014/0265500 | A1 * | 9/2014 | Hough | A61G 5/14 297/340 |
| 2017/0233042 | A1 * | 8/2017 | Curts | B63B 29/04 114/363 |

* cited by examiner

*Primary Examiner* — David E Allred
(74) *Attorney, Agent, or Firm* — Andrus Intellectual Property Law, LLP (57) ABSTRACT

A convertible seating system for a marine vessel includes a frame and a seat mounted on the frame and defining a first support surface. A backrest is configured for movement relative to the seat and the frame between a first position and a second position. In the second position, the backrest defines a second support surface lying generally parallel and vertically displaced relative to the first support surface.

14 Claims, 11 Drawing Sheets

CONVERTIBLE LEANING POST SEATING SYSTEM FOR MARINE VESSELS

FIELD

The present disclosure relates to marine vessels and watercraft, and more particularly, pertains to a convertible seating system for marine vessels and watercraft.

BACKGROUND

U.S. Pat. No. 9,073,608, which is herein incorporated by reference in entirety, discloses a seating system for watercraft having a base supporting a seating surface and a backrest pivotably attached to the base. The backrest pivots about the seating surface to provide a plurality of selectable seating positions. The backrest is pivotably attached to the base by an arm attached to the side of the backrest. The arm engages a guide member attached to the base, the guide member having one or more positional slots corresponding to the plurality of selectable seating positions. The backrest can be positioned upright, at an angle, or flat with respect to the seating surface to provide a plurality of seating configurations including simultaneous forward and aft seats, an aft-facing lounge seat and a sunpad. The seating surface comprises hingeable seat cushions permitted access to storage compartments inside the base. The seating system can be installed adjacent to a bulkhead on a watercraft to provide an aft-facing lounge seat.

U.S. Pat. No. 9,021,975, which is herein incorporated by reference in entirety, discloses a seating system for marine vessels and watercraft including a chair having a backrest, a seat bottom and a lounge extension element wherein a first end of the extension element is hingeably attached to and extends from the seat bottom and wherein a second end of the extension element is configured to be hingeably attached to a first rigid structure such as a bulkhead on a watercraft. The seating system is convertible between a forward-facing seat configuration and an aft-facing lounger configuration. In the aft-facing lounger configuration, the extension element and the seat bottom are substantially parallel to one another. In the forward-facing seat configuration, the extension element is substantially upright and at an acute angle with respect to the seat bottom.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a seating system for a marine vessel includes a frame and a seat mounted on the frame and defining a first support surface. A backrest is configured for movement relative to the seat and the frame between a first position and a second position. In the second position, the backrest defines a second support surface lying generally parallel and vertically displaced relative to the first support surface.

According to another example of the present disclosure, a seating system for a marine vessel includes a frame and a seat fixed on the frame and having a front surface, a rear surface and an upper surface defining a primary seating surface. A backrest is adjustably connected to the frame for movement rearwardly of the seat between at least one raised position oriented angularly relative to the seat, and a lowered horizontal position extending behind and beneath the seat to provide a plurality of selectable seating positions. The lowered horizontal position of the backrest defines a supplementary seating surface, and the rear surface of the seat defines a supplementary backrest.

According to a further example of the present disclosure, a seating system for a marine vessel includes a frame having opposed side members, and a seat fixed on the frame and having a front surface, a rear surface and an upper surface defining a primary seating surface. A backrest is pivotally attached within the frame by a pair of pivot arms configured for movement into and out of the rear surface of the seat. The backrest is pivotable between at least one raised position extending above the seat, and a lowered position behind and beneath the seat to provide a plurality of selectable seating positions. In the lowered position, the backrest defines a supplementary seating surface which is generally parallel to the primary seating surface, and the rear surface of the seat defines a supplementary backrest. The backrest is configured to convert the seating system between a forward-facing seat and an aft-facing seat. A positioning plate is secured to an inside surface of each of the opposed side members of the frame, and is configured with a curved portion provided with at least one positional aperture. Each of the pivot arms is provided with a spring-biased retaining pin arrangement which is engagable with the at least one positional aperture in the positioning plate in the at least one raised position of the backrest, and is disengagable from and movable out of the at least one positional aperture and away from the positioning plate in the lowered position. A release handle is mounted for sliding vertical movement in an upper medial portion of the backrest, and is operatively connected by cables to the spring-biased retaining arrangement.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clearness and understanding. No unnecessary limitations are to be inferred therefrom beyond the requirement of the prior art because such terms are used for descriptive purposes only and are intended to be broadly construed.

Figure 1:
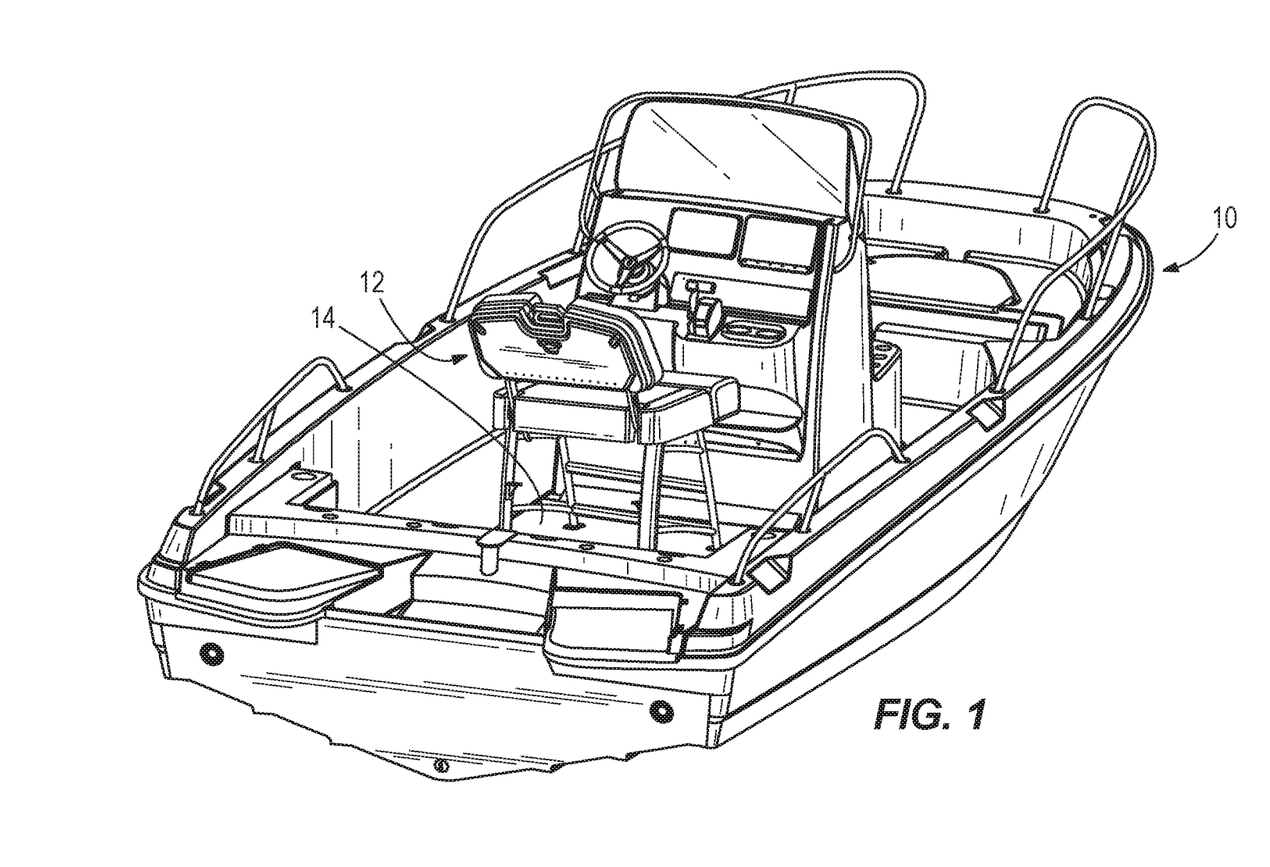
FIG. 1 is a perspective view of a boat provided with a convertible seating system in accordance with the present disclosure and showing a first seating configuration.

FIG. 1 illustrates a boat 10 equipped with a seating system 12 defining a convertible leaning post seating arrangement in accordance with an exemplary preferred embodiment of the present disclosure. The seating system 12 is designed to be installed on a deck 14 of the boat 10, and is configured to provide sitting and leaning surfaces as well as a number of other useful functions as will be described below.

Figure 2:
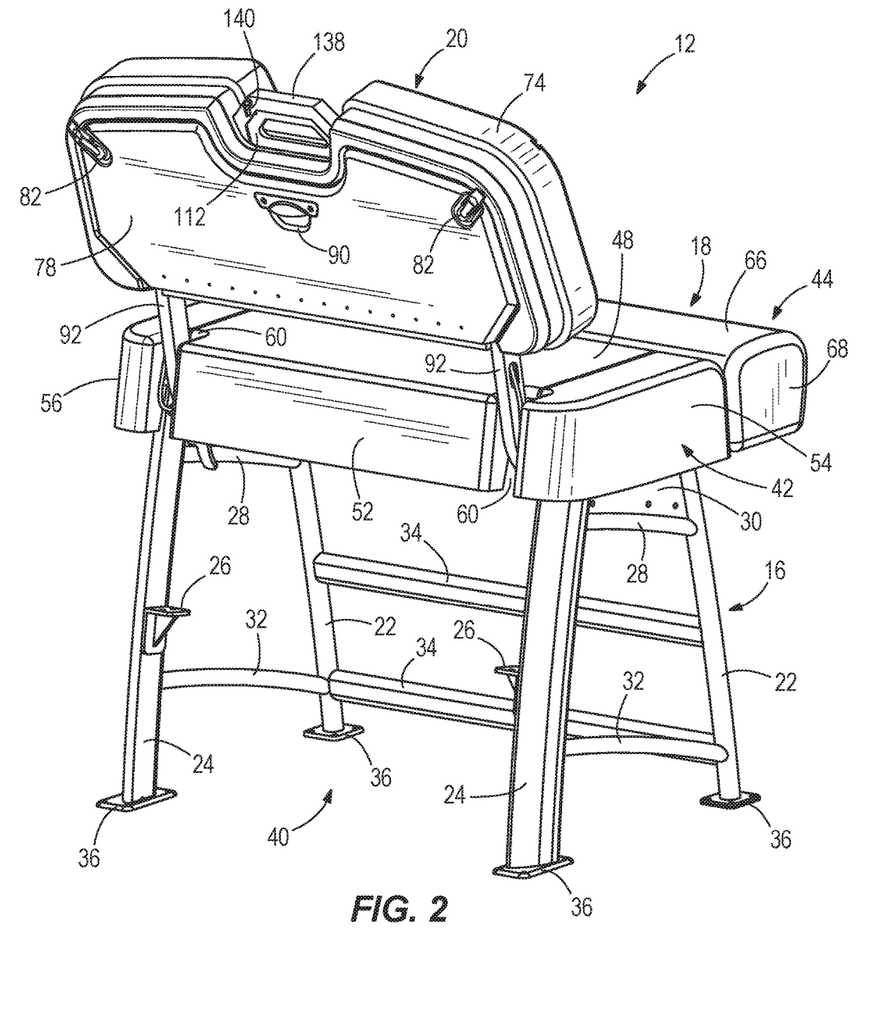
FIG. 2 is a rear perspective view of the convertible seating system shown in FIG. 1.
Figure 3:
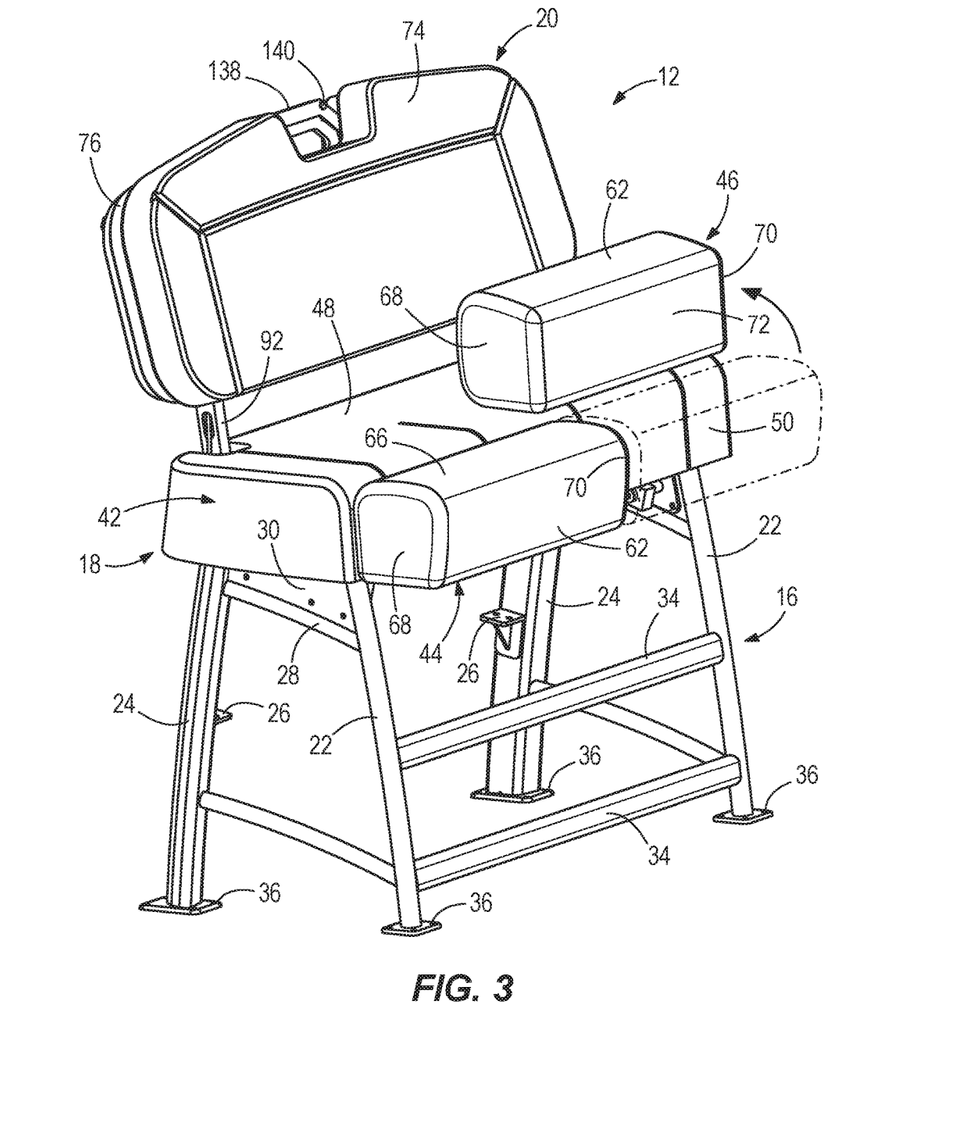
FIG. 3 is a front perspective view of the convertible seating system shown in FIG. 1.

Referring to FIGS. 2 and 3, seating system 12 is generally comprised of a frame 16, a seat 18 formed by one or more cushions and an adjustable backrest 20.

Figure 10:
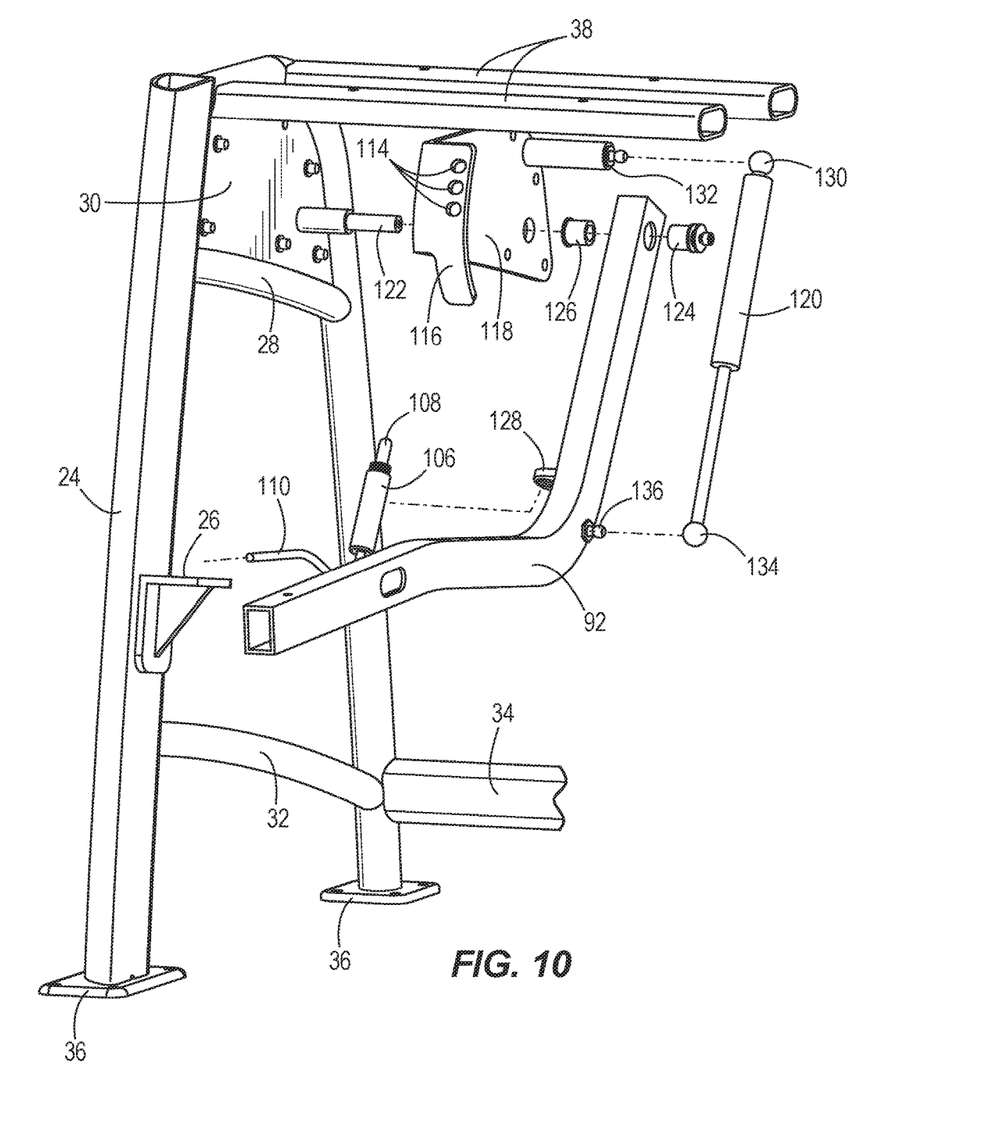
FIG. 10 is an exploded view of various elements of the convertible seating system shown in the second seating configuration of FIGS. 8 and 9.

The frame 16 is constructed of rigid structural elements for supporting the seat 18 and the backrest 20, and includes a front end with a pair of front legs 22, and a rear end with a pair of rear legs 24 provided with support brackets 26. A pair of upper side rails 28 includes side braces 30 and a pair of lower side rails 32 extend between the front legs 22 and the rear legs 24. A pair of cross members 34 interconnect the front legs 22, and a set of feet 36 is provided at the bottom ends of the front legs 22 and the rear legs 24 for fixing the frame 16 to a support surface, such as formed by the deck 14 of the boat 10. As seen in FIG. 10, the top of the frame 16 includes a pair of tubes 38 which form a mounting surface for a portion of the seat 18. As best seen in FIG. 2, the frame 16 is configured to define a storage space 40 which is accessible rearwardly from between the rear legs 24 for receiving a removable storage unit such as a cooler or live well. The present disclosure also contemplates molding in the storage unit within the storage space 40 formed by the frame 16. The storage space 40 may be also be used to store other accessories therein.

In the exemplary embodiment, the seat 18 includes a first cushion in the form of a seat base 42, an optional second cushion in the form of a first bolster 44 and an optional third cushion in the form of a second bolster 46. The first bolster 44 and the second bolster 46 define a bolster arrangement used to provide sitting and leaning capability during use of the seating system 12 as will be better understood hereafter. The seat base 42 has an upper surface 48, a front surface 50, a rear surface 52, a pair of opposed side surfaces 54, 56, and a lower surface 58 (FIG. 7) which is fixed to the frame 16. The rear surface 52 of the seat base 42 is provided with a pair of spaced apart recesses 60 for enabling movement of a pair of pivot arms connected to the back rest 20 into and out of the seat 18 as will be more fully explained below. The first bolster 44 and the second bolster 46 each have a front surface 62, a back surface 64, a top surface 66, a pair of side surfaces 68, 70 and a bottom surface 72. In addition, the first bolster 44 and the second bolster 46 each include an arm 73 (one being seen in FIG. 9) which is pivotally mounted to the seat base 42.

Figure 9:
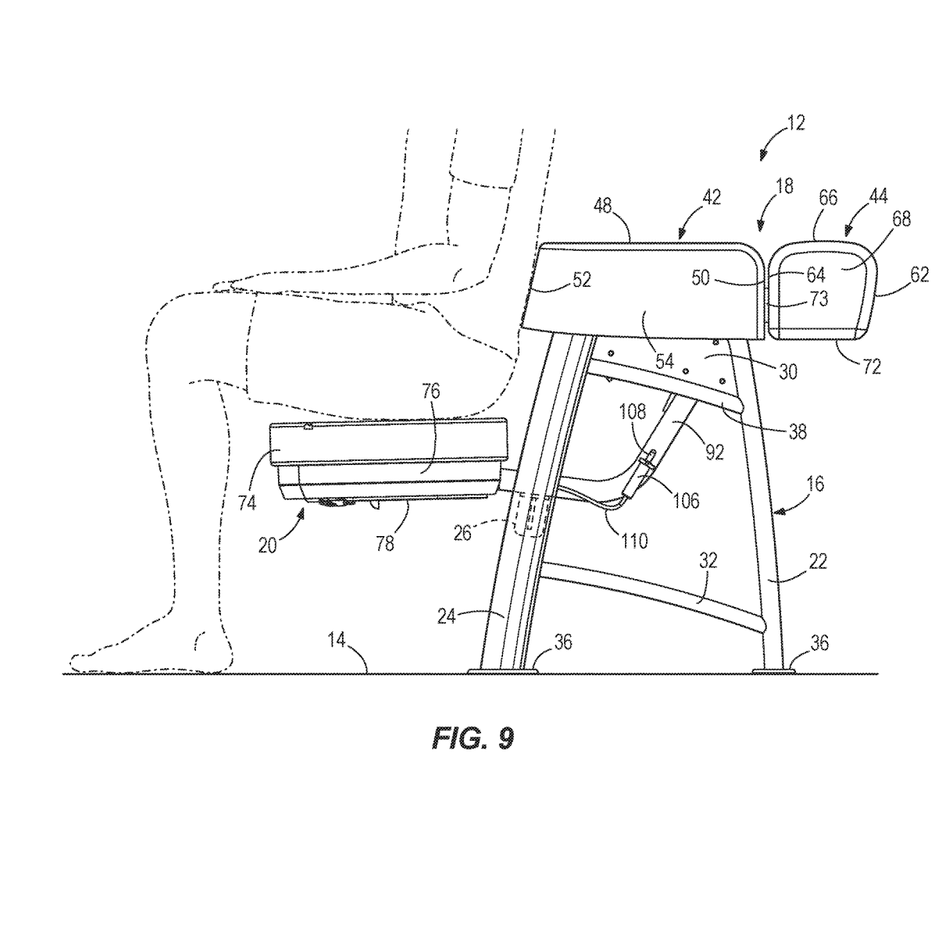
FIG. 9 is an elevational view of the backrest in the lowered horizontal position as shown in FIG. 8.

The first bolster 44 and the second bolster 46 are configured in a seating mode to extend forwardly from the front surface 50 of the seat base 42 such that the top surfaces 66 of the first bolster 44 and the second bolster 46 are generally coplanar with the upper surface 48 of the seat base 42 as shown in FIG. 9. Together, the upper surface 48 of the seat base 42 and the top surfaces 66 of the first bolster 44 and the second bolster 46 define a first support surface in the form of a primary seating surface. In the seating mode, the cross members 34 may be used as foot rests for the occupants of the seating system 12. Alternatively, the first bolster 44 and the second bolster 46 are configured to flip up 90 degrees as depicted by the arrow in FIG. 3 such that a boat operator may lean against the bottom surface 72 of at least the second bolster 46 to operate the boat in a standing leaning post mode rather than the seating mode. It should be understood that the bolster arrangement is an optional feature, and that the seat 18 can be formed by the seat base 42 alone without the first bolster 44 and the second bolster 46. In the example shown, the seat 18 is normally configured as a bench for the seat occupants such that each occupant may configure the seat 18 in either the seating or the leaning post mode as desired. The particular size and shape configuration of the seat 18 is not limited, however, to those embodiments shown therein.

Figure 11:
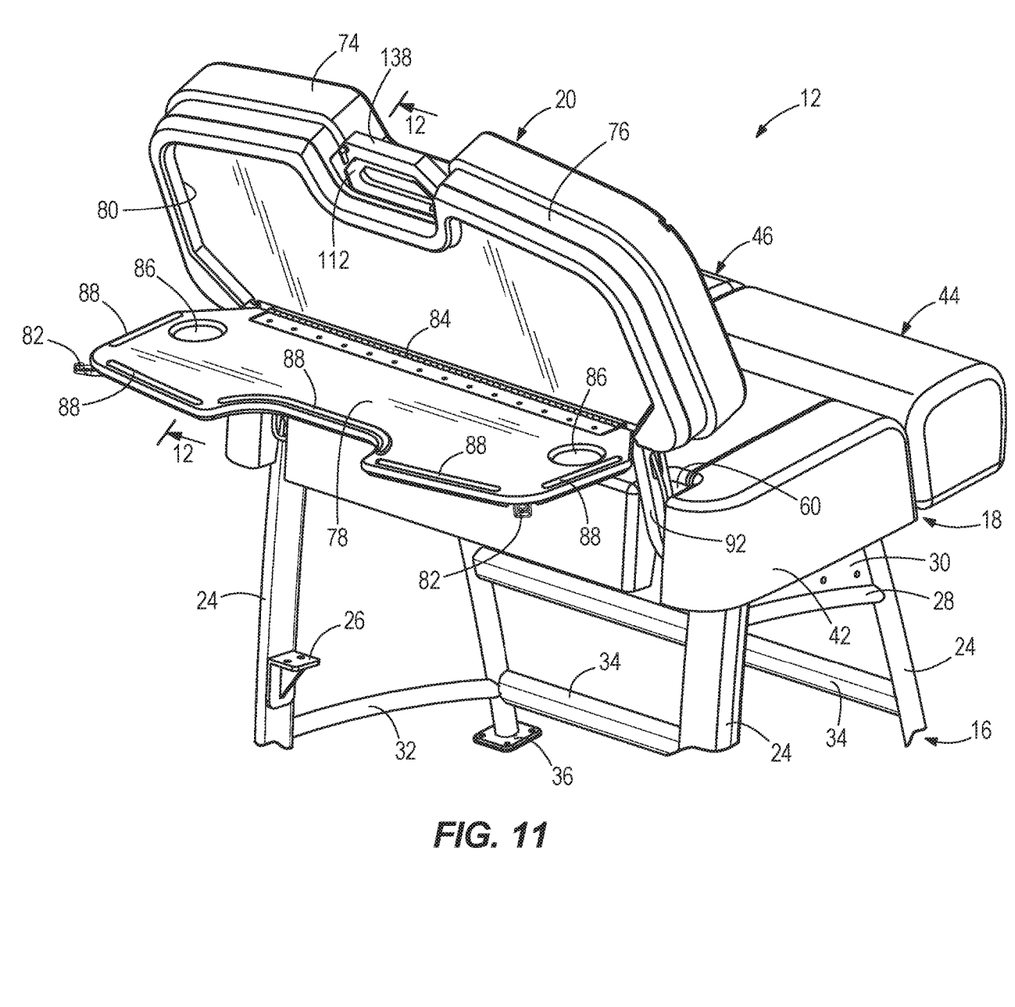
FIG. 11 is a partial rear perspective view of the convertible seating system illustrating a deployable work table extended from the backrest.
Figure 12:
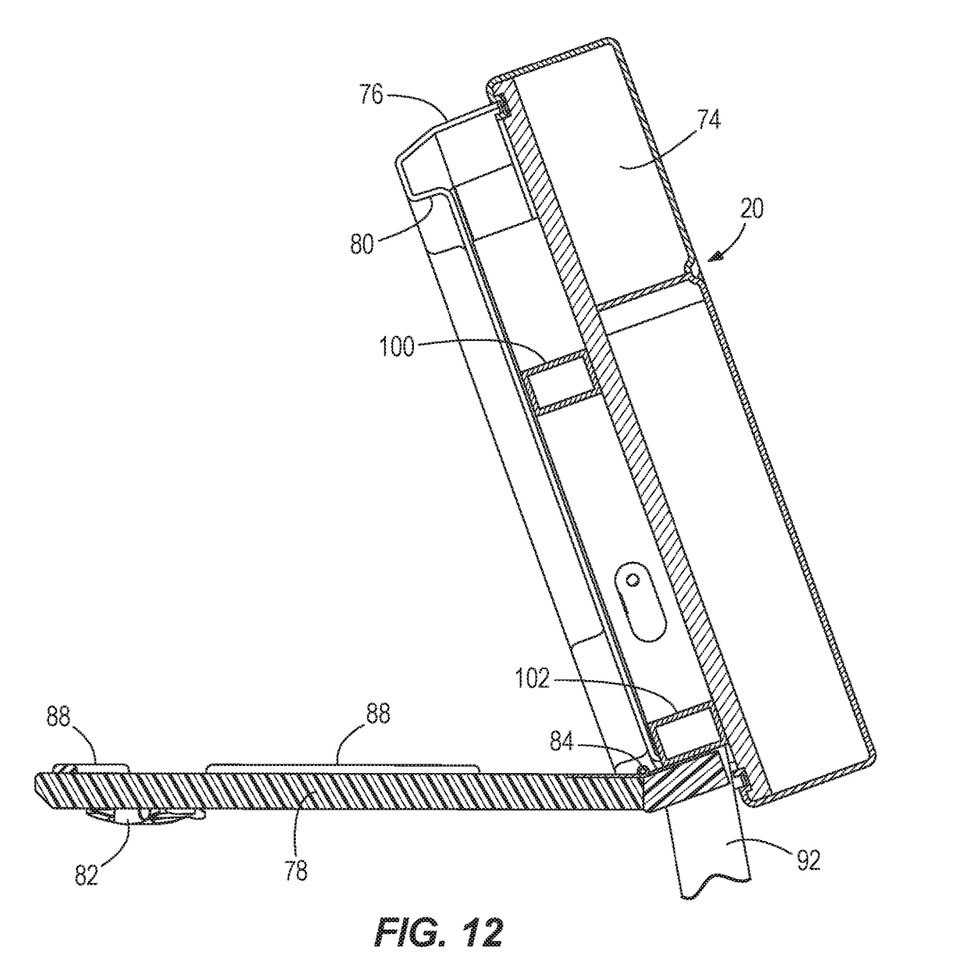
FIG. 12 is a sectional view of the deployable work taken on line 12-12 of FIG. 11.

The backrest 20 includes a back-engaging cushion 74 which is secured to a rear cover 76 optionally provided with a deployable work table 78. Referring to FIGS. 2, 11 and 12, the work table 78 is normally held in a raised storage position within a recess 80 formed in the rear cover 76 by a pair of retaining devices, such as a pair of overcenter locking mechanisms 82. The work table 78 is pivotally connected by a hinge 84 extending across a lower end of the rear cover 76. Releasing the overcenter locking mechanisms 82 enables the work table 78 to pivot downwardly about the hinge 84 to a lowered working position which is generally parallel to the deck 14 of the boat 10. In the lowered working position, it can be seen that the work table 78 is formed with circular recessed areas 86, such as for holding cups, and raised surfaces 88, such as for retaining various items. The work table 78 is provided with a handle 90 for facilitating movement between the raised and lowered positions.

Figure 4:
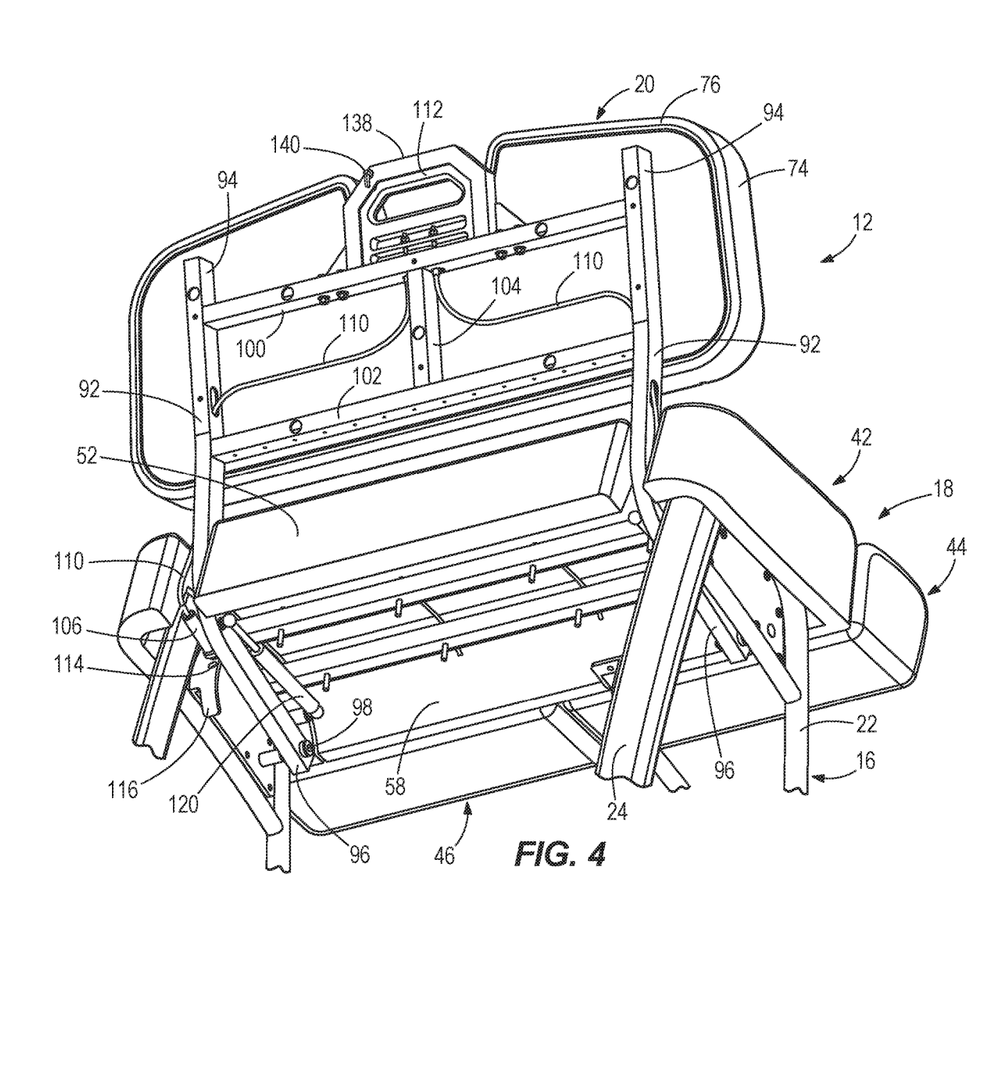
FIG. 4 is a bottom perspective view of the convertible seating system shown in FIG. 2 with parts of a backrest removed to illustrate an actuator used in adjusting the position of the backrest.

The backrest 20 is adjustably connected by a pivot arrangement including a pair of pivot arms 92 to the frame 16, and is configured for pivot movement rearwardly of the frame 16 and the seat 18 between at least one raised position (FIGS. 2-4) above the seat 18, and a lowered horizontal position (FIGS. 8 and 9) beneath the seat 18 to provide a number of selectable backrest and seating positions. As the backrest 20 is moved between the at least one raised position and the lowered horizontal position, the pivot arms 92 move into and out of the recesses 60 in seat base 42. Referring to FIG. 4, each of the pivot arms 92 has a curved contour, and has one end 94 fixed to and within the rear cover 76, and an opposite end 96 pivotally connected by a pivot connection 98 relative to one of the side braces 30. Portions of the pivot arms 92 extending into the rear cover 76 are interconnected by transverse crossbeams 100, 102, and a vertical brace 104 is joined between the transverse crossbeams 100, 102.

Figure 7:
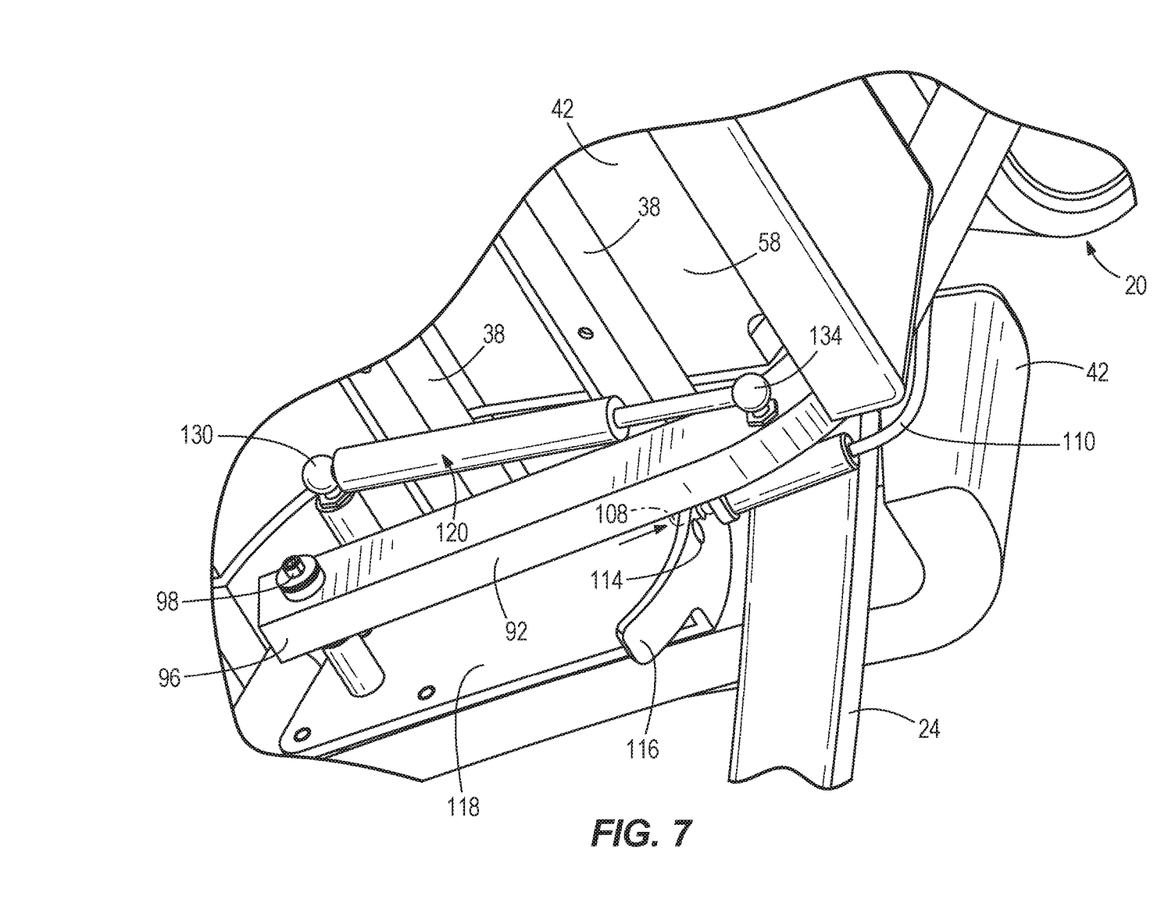
FIG. 7 is an enlarged fragmentary view of various details of the convertible seating system of FIG. 1 taken from beneath the seat.
Figure 8:
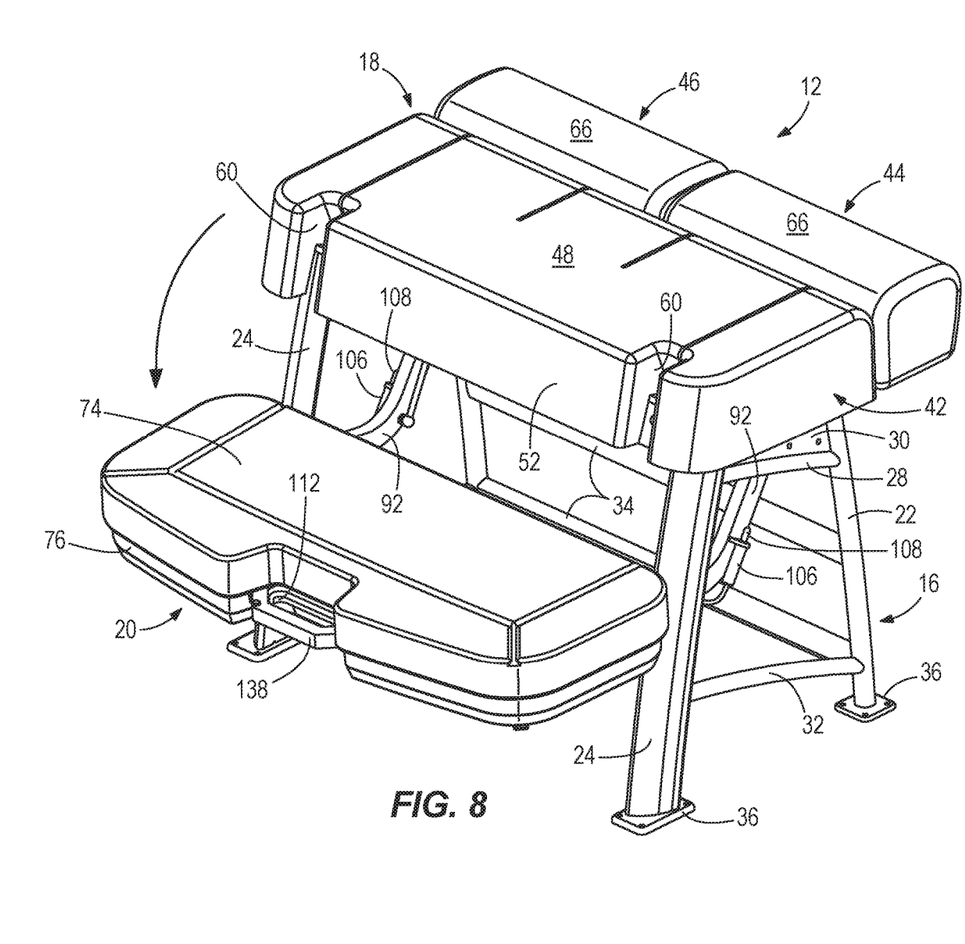
FIG. 8 is a rear perspective view of the convertible seating system showing the backrest moved rearwardly of the seat to a lowered horizontal position and illustrating a second seating configuration.

As seen in FIGS. 4, 7 and 8, in order to establish and control selective positioning of the backrest 20, the pivot arrangement also includes a pair of tubular retainers 106 which are attached to outside surfaces of the pivot arms 92 for holding retaining elements such as spring-biased retaining pins 108. Together, the tubular retainers 106 and the retaining pins 108 define a retaining arrangement. The retaining pins 108 are connected to cables 110 which are routed through the pivot arms 92 and the rear cover 76, and secured to a release handle 112 defining an actuator. The retaining pins 108 are designed for selective engagement with one of a number of positional apertures 114 formed in curved portions 116 of positioning plates 118 (one being seen in FIG. 4) fixed to the frame 16 to normally retain the pivot arms 92 and the backrest 20 in the at least one raised position (FIGS. 2-4). In addition, the retaining pins 108 are designed for selective disengagement with and movement away from the positional apertures 114 on the positioning plates 118 to enable pivoting of the backrest 20 to the lowered horizontal position (FIGS. 8 and 9). Smooth controlled pivoting motion of the backrest 20 and the pivot arms 92 to their desired selectable position is provided by a motion assistance arrangement, such as formed by a pair of extendable and retractable gas struts 120.

As can be further understood from FIG. 10, each positioning plate 118 is secured on an inside surface of one of the side braces 30, and receives a tubular element 122 projecting therefrom to which the opposite end 96 of each pivot arm 92 is pivotally connected using connector elements 124, 126. In the exemplary embodiment, the curved portion 116 of each positioning plate 118 is formed with three positional apertures 114 which provides for three different raised positions of the backrest 20 that are oriented at different angles relative to the seat 18. More or less positional apertures 114 may be provided on the positioning plates 118 to provide the raised positioning of the backrest 20 as desired. Each retaining pin 108 projects through a guide bracket 128 provided on a respective pivot arm 92 before engagement and disengagement with one of the positional apertures 114. Each gas strut 120 has a base end 130 which is pivotally connected to a tubular element 132 projecting from each positioning plate 118, and a rod end 134 which is pivotally attached to an extension 136 on each pivot arm 92.

Figure 5:
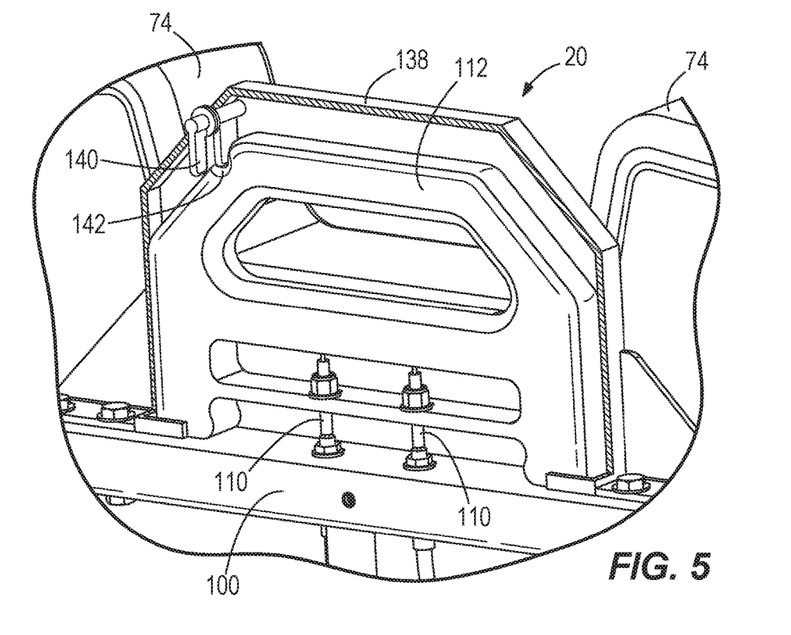
FIG. 5 is an enlarged detail view of a release handle of the actuator of FIG. 4 shown in a locked position.
Figure 6:
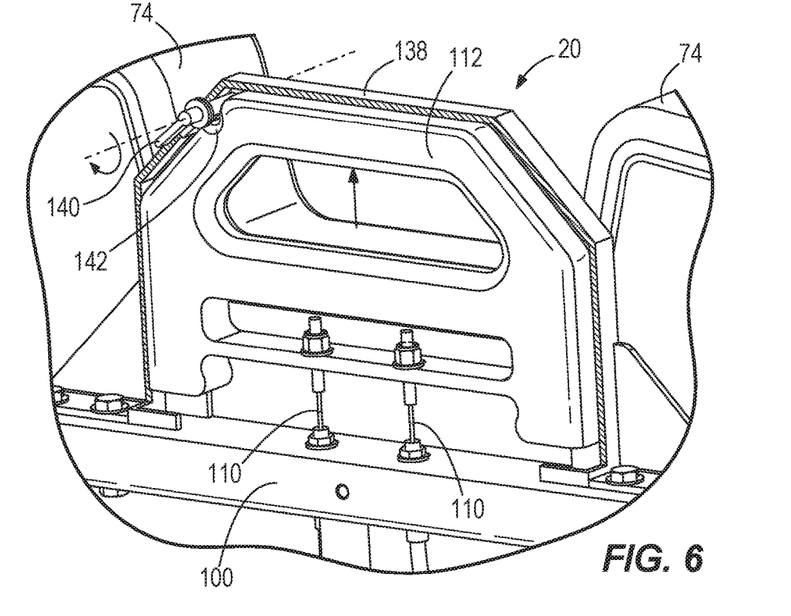
FIG. 6 is an enlarged detail view similar to FIG. 5 illustrating actuation of the release handle from the locked position.

Referring now to FIGS. 5 and 6, the release handle 112 is slidably mounted for vertical movement between a locked position and an unlocked position in an upper medial portion 138 of the rear cover 76. A spring-biased trigger device 140 is pivotally mounted to the upper medial portion 138 and is configured for selective engagement with and disengagement from a notch 142 formed in the release handle 112 to enable locking and unlocking thereof. In the position shown in FIG. 5, the backrest 20 is normally held in the at least one raised position (FIGS. 2-4) by the spring-biased engagement of the retaining pins 108 in the selected positional apertures 114. Movement of the release handle 112 is prevented by the positioning of the trigger device 140 in the notch 142.

To adjust the position of the backrest 20, the release handle 112 is accessed rearwardly of the seat 18 such that a user manually grasps the release handle 112 and disengages the trigger device 140 from the notch 142 as depicted by the arrow in FIG. 6. The user then pulls the release handle 112 upwardly along with the cables 110 which retracts the retaining pins 108 from the selected positional apertures 114. While continuing to pull upwardly on release handle 112, the user then pivots the backrest 20 to align the retaining pins 108 with different positional apertures 114 if it is desired to establish a different raised angular position of the backrest 20. At this point, the release handle 112 is released causing the retaining pins 108 to extend into the desired positional apertures 114 to retain the backrest 20 in the desired raised position. Upon release, the release handle 112 is pulled downwardly by the spring force on the cables 110, and the trigger device 140 is reset to the position of FIG. 5. Alternatively, with the release handle 112 pulled upwardly to retract the retaining pins 108, the backrest 20 can be pivoted to the lowermost horizontal position (FIGS. 8 and 9) beneath and behind the seat 18 after which the release handle 112 can be released to the position of FIG. 5. It should be appreciated that the present disclosure contemplates the use of alternative actuators and engagement devices other than the release handle 112 and the trigger device 140 such as an electronic or solenoid arrangement, and/or various detent mechanisms for releasing and retaining backrest 20 in a desired position.

In certain embodiments depicted in FIGS. 2-4, the backrest 20 is adjusted to provide the seating system 12 with a first seating configuration facing in a first direction such as a forward-facing seat in the boat 10. In the first seating configuration, the backrest 20 is normally placed in the raised position to provide proper body support for seat occupants, such as during boat operation. If desired, the backrest 20 may be adjusted to alternative positions which can provide more comfortable lounging angular seat positions in the first seating configuration.

In accordance with the present disclosure, the backrest 20 can be adjusted to the lowered horizontal position as depicted in FIGS. 8 and 9 wherein the seating system 12 is conveniently converted to a second seating configuration facing in a second direction opposite the first direction, such as an aft-facing seat for an occupant in the boat 10. In the second seating configuration, the backrest 20 lies rearwardly of and below the seat 18 with the pivot arms 92 resting on the support brackets 26 provided on the rear legs 24 of the frame 16. Smooth controlled movement of the backrest 20 to the lowered horizontal position is adjusted by the motion assistance arrangement, such as provided in the exemplary embodiment by the gas struts 120 positioned on each of the pivot arms 92. The gas struts 120 are particularly useful in preventing free fall of the backrest 20 to the lowered horizontal position if the release handle 112 slips from a user's grasp. Other suitable motion assistance arrangements such as gas tension springs, or electric, hydraulic or tension devices are further contemplated by the present disclosure.

In the second seating configuration, the back-engaging cushion 74 of the backrest 20 defines a second support surface in the form of a supplementary seating surface which lies generally parallel to and vertically displaced beneath the first support surface defined by the primary seating surface formed by the seat base 42 and the first bolster 44 and the second bolster 46. In addition, the rear surface 52 of the seat 18 defines a supplementary backrest. It should be understood that the present disclosure also contemplates that the second support surface provided by the backrest 20 in the lowered horizontal position could also form a work support surface. Thus, it should be understood that the seating system 12 provides the user with a variety of flexible seating options and useful features.

In the present disclosure, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. A seating system for a marine vessel, the seating system comprising:
    a frame comprising a pair of front legs and a pair of rear legs that extend downwardly from the seat;

a seat fixedly mounted on the frame and defining a first support surface having a pair of recesses extending from a rear edge of the support surface into the support surface;

a backrest configured for movement relative to the seat and the frame between a first position and a second position, wherein in the second position the backrest defines a second support surface positioned beneath the first support surface and lying generally parallel to the first support surface, wherein the first support surface defines a primary seating surface and the second support surface defines a supplementary seating surface, and wherein with the backrest in the second position, a portion of the seat defines a supplementary backrest, and wherein the backrest in the first position defines a first seating configuration facing in a first direction and wherein the backrest in the second position defines a second seating configuration facing in a second direction that is opposite the first direction; and a pair of pivot arms that pivotally attach the backrest to the frame, the backrest fixedly mounted on the pair of pivot arms, the pair of pivot arms being moved into and out of the pair of recesses in the seat upon movement of the backrest between the first position and the second position.

2. The seating system of claim 1, wherein each of the pivot arms is provided with a retaining arrangement which is engagable with a positioning plate mounted inside the frame in the first position of the backrest, and which is disengagable and movable away from the positioning plate in the second position of the backrest.

3. The seating system of claim 1, wherein a motion assistance arrangement is provided between each of the pivot arms and the frame to facilitate a controlled movement of the backrest between the first position and the second position.

4. The seating system of claim 2, wherein an actuator is slidably mounted in the backrest, and operatively connected to the retaining arrangement on each of the pivot arms.

5. The seating system of claim 1, wherein the frame is configured to provide a storage space beneath the seat.

6. The seating system of claim 1, wherein the backrest is operatively held in the second position by support brackets provided on the frame.

7. A seating system for a marine vessel, the seating system comprising:
a frame comprising a pair of front legs and a pair of rear legs that extend downwardly from the seat;

a seat fixedly mounted on the frame and defining a first support surface having a pair of recesses extending from a rear edge of the support surface into the support surface;

a backrest configured for movement relative to the seat and the frame between a first position and a second position, wherein in the second position the backrest defines a second support surface positioned beneath the first support surface and lying generally parallel to the first support surface, wherein the first support surface defines a primary seating surface and the second support surface defines a supplementary seating surface, and wherein with the backrest in the second position, a portion of the seat defines a supplementary backrest, and wherein the backrest in the first position defines a first seating configuration facing in a first direction and wherein the backrest in the second position defines a second seating configuration facing in a second direction that is opposite the first direction; and a pair of pivot arms that pivotally attach the backrest to the frame, the backrest fixedly mounted on the pair of pivot arms, wherein the backrest is operatively held in the second position by support brackets on opposing rear legs in the pair of rear legs, the support brackets supporting the pair of pivot arms when the backrest is moved into the second position.

8. The seating system of claim 7, wherein a positioning plate is secured to an inside surface of the frame on opposed sides thereof, and is provided with at least one positional aperture.

9. The seating system of claim 7, wherein each of the pivot arms is provided with a retaining arrangement which is engagable with the at least one positional aperture in the positioning plate in the at least one raised position of the backrest, and is disengagable from and movable out of the at least one positional aperture and away from the positioning plate in the lowered horizontal position of the backrest.

10. The seating system of claim 9, wherein a release handle is mounted for sliding vertical movement within an upper medial portion of the backrest, and is operatively connected to the retaining arrangement on each of the pivot arms.

11. The seating system of claim 10, wherein a trigger device is movably mounted on the upper medial portion of the backrest, and is configured for selective engagement and disengagement with the release handle to enable locking and unlocking thereof.

12. The seating system of claim 7, wherein an extendable and retractable device is provided between each of the pivot arms and the positioning plate, and configured to facilitate controlled movement of the backrest between the at least one raised position and the lowered horizontal position.

13. A seating system for a marine vessel, the seating system comprising:
a frame having opposed side members each comprising a front leg and a rear leg;

a seat fixed on the frame and having a front surface, a rear surface and an upper surface defining a primary seating surface; and a backrest pivotally attached within the frame by a pair of pivot arms configured for movement into and out of recesses in the rear surface of the seat, the backrest fixedly mounted to the pair of pivot arms, and the backrest being pivotable between at least one raised position extending above the seat, and a lowered position behind and beneath the seat to provide a plurality of selectable seat positions, wherein, in the lowered position, the backrest defines a supplementary seating surface which is generally parallel to the primary seating surface, and the rear surface of the seat defines a supplementary backrest, wherein the backrest is configured to convert the seating system between a forward-facing seat and an aft-facing seat, wherein a positioning plate is secured to an inside surface of each of the opposed side members of the frame, and is configured with a curved portion provided with at least one positional aperture, wherein each of the pivot arms is provided with a spring-biased retaining pin arrangement which is engagable with the at least one positional aperture in the positioning plate in the at least one raised position of the backrest and is disengagable from and movable out of the at least one positional aperture and away from the positioning plate in the lowered position, and wherein a release handle is mounted for sliding vertical movement in an upper medial portion of the backrest, and is operatively connected by cables to the spring-biased retaining arrangement.

14. The seating system of claim 13, wherein a gas strut has a base end pivotally connected to each positioning plate, and a rod end pivotally connected to each of the pivot arms.

* * * * *